(12) United States Patent
Simon et al.

(10) Patent No.: US 7,388,990 B2
(45) Date of Patent: Jun. 17, 2008

(54) LOCAL MASS DISTRIBUTION PARTITIONING FOR OBJECT RECOGNITION

(75) Inventors: Christian Simon, Laval (CA); Jean-Simon Lapointe, Montréal (CA); Stéphane Baldo, Montréal (CA)

(73) Assignee: Matrox Electronics Systems, Ltd., Dorval, Quebec (CA)

( * ) Notice: Subject to any disclaimer, the term of this patent is extended or adjusted under 35 U.S.C. 154(b) by 832 days.

(21) Appl. No.: 10/666,242

(22) Filed: Sep. 22, 2003

(65) Prior Publication Data

US 2005/0063590 A1    Mar. 24, 2005

(51) Int. Cl.
G06K 9/62    (2006.01)
(52) U.S. Cl. .................. 382/209; 382/197
(58) Field of Classification Search ............ 382/173, 382/181, 190, 197, 209, 217–218, 224
See application file for complete search history.

(56) References Cited

U.S. PATENT DOCUMENTS

| | | | |
|---|---|---|---|
| 4,903,312 A | 2/1990 | Sato | |
| 4,903,313 A | 2/1990 | Tachikawa | |
| 5,841,902 A | 11/1998 | Tu | |
| 5,915,250 A * | 6/1999 | Jain et al. | 707/100 |
| 6,128,410 A * | 10/2000 | Park et al. | 382/218 |
| 6,272,245 B1 * | 8/2001 | Lin | 382/195 |
| 6,901,163 B1 * | 5/2005 | Pearce et al. | 382/165 |
| 6,999,623 B1 * | 2/2006 | Yamaoka et al. | 382/209 |
| 2005/0036709 A1 * | 2/2005 | Imai | 382/286 |

OTHER PUBLICATIONS

English translation of Japanese Patent Application No. 138723 (pp. 1-41).*

H.D. Cheng and R. Desai, Scene Classification by Fuzzy Local Moments, International Journal of Pattern Recognition and Artificial Intelligence, vol. 12, No. 7, pp. 921-938, 1998).

R.T. Chin and C.R. Dyer, Model-Based Recognition in Robot Vision, Computing Surveys, vol. 18, No. 1, Mar. 1996.

R. Mukundan and K.R. Ramakrishnan, Moment Functions in Image Analysis, World Scientific Publishing, pp. 9-15, 1998.

Jaehwa Park, Venu Govindaraju and Sargur N. Srihari, OCR In a Hierarchical Feature Space, IEEE Transactions on Pattern Analysis and Machine Intelligence, Apr. 2000, pp. 400-407, vol. 22 No. 4.

John T. Favata and Geetha Srikantan, A Multiple Feature/Resolution Approach to Handprinted Digit and Character Recognition, International Journal of Imaging Systems and Technology, Special Issue: Document Analysis and Recognition; Winter 1996, pp. 304-311, vol. 7, No. 4.

Ø.D. Trier, A.K. Jain and T. Taxt, Feature Extraction Methods for Character Recognition—A Survey, Pattern Recognition, vol. 29, No. 4, pp. 641-662, 1996).

* cited by examiner

*Primary Examiner*—Daniel Mariam
(74) *Attorney, Agent, or Firm*—Lowrie, Lando & Anastasi, LLP

(57) ABSTRACT

A method for determining a similarity score of a target object with respect to a model object. The target object is in a plane and the model object is represented by a model feature vector. The method comprises generating regions of the plane according to a first mass distribution of the target object and a second mass distribution of a part of the target object. Each of the generated regions has a corresponding mass distribution indicator. The method further comprises calculating a target feature vector for the target object according to at least one of the corresponding mass distribution indicators. Finally, the method computes the similarity score using the target feature vector and the model feature vector.

37 Claims, 10 Drawing Sheets

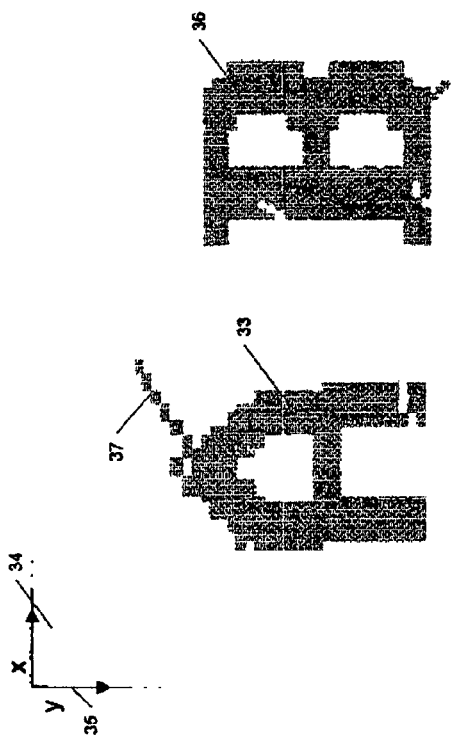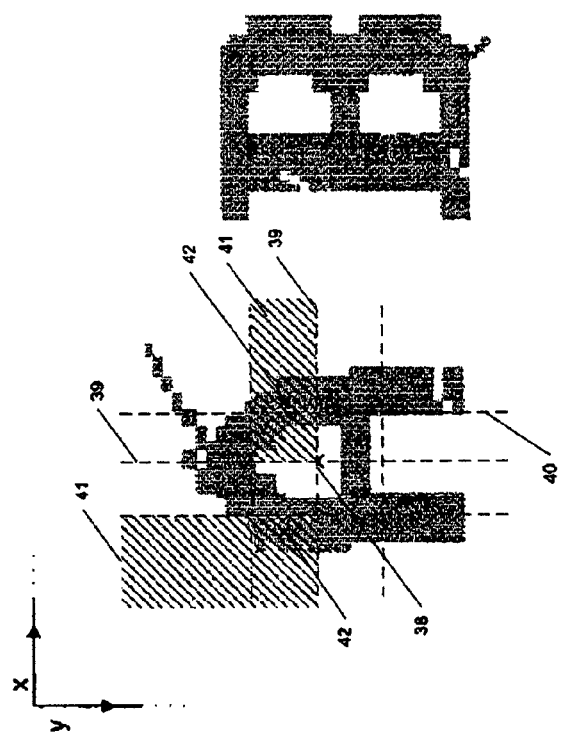
Figure 9a
Figure 9b

LOCAL MASS DISTRIBUTION PARTITIONING FOR OBJECT RECOGNITION

CROSS-REFERENCE TO RELATED APPLICATIONS

This is the first application filed for the present invention.

FIELD OF THE INVENTION

The present invention relates to machine vision, and in particular to a global method for object recognition using local moments.

BACKGROUND OF THE INVENTION

Techniques of optical object recognition have applications in a variety of fields, including automated manufacturing, biomedical engineering, security, and document analysis.

Most object recognition methods measure the similarity between two objects based on a set of features extracted from each of the objects. These methods can be classified into three types—Global feature methods, structural feature methods, and relational graph methods—explained in "Model-Based Recognition in Robot Vision" (R. T. Chin and C. R. Dyer, Computing Surveys, Vol.18, No.1, March 1996).

In global feature methods, the object is represented by a feature vector containing n global features of the object. Thus, each object can be viewed as a point in an n-dimensional feature space, and two objects can be compared using a function of their corresponding points in the feature space, such as a measure of distance.

An application usually associated with global methods is object identification, which consists of recognizing an isolated object (target object) contained in an image as one in a bank of predefined model objects. Typically, the object identification process comprises two main phases: model definition and object recognition. During the model definition phase, each of the model objects is represented by a feature vector according to a chosen feature extraction scheme. During the object recognition phase, an image is acquired (e.g. using a gray-scale digital camera, etc.) and pre-processed to isolate individual objects. For one of these isolated objects, the target object, a feature vector is extracted according to the chosen feature extraction scheme. This feature vector is then compared to the feature vectors of the model objects; each target-model pair is attributed a similarity score.

In object identification applications, the model object as it occurs in the target image may have undergone an affine transformation (e.g. translation, rotation, scale variation, aspect-ratio variation, skew, etc.) and degradation of various types (e.g. erosion and dilatation, addition or subtraction of pieces, etc.). For gray scale images, the model object may have been affected by a change in image contrast or mean gray level.

Therefore, object identification must support the set of affine transformations and be robust to the types of degradation expected for the specific application. Support for the transformations can be achieved by including in the pre-processing stage one or more standardization steps during which the object is roughly centered in the sub-image and normalized to a standard size and orientation; and/or by selecting features that are invariant under the transformations; and/or by choosing a similarity measure that detects the correlation between the vectors of two objects related through an affine transformation.

In global feature methods, the process of feature extraction consists of extracting from the object a set of features adequate for identification purposes, namely a set of features that vary across the model objects and thus enable their differentiation. Various types of features are used in object recognition, as described in "Feature Extraction Methods for Character Recognition—A Survey" (Ø. D. Trier, A. K. Jain and T. Taxt, Pattern Recognition, Vol. 29, No. 4, pp. 641-662, 1996).

A particular class of features used for object recognition are those derived from geometric moments of the object, as described in *Moment Functions in Image Analysis* (R. Mukundan and K. R. Ramakrishnan, World Scientific Publishing, 1998). Geometric moments of different orders of the object provide different spatial characteristics of the intensity distribution within the object (and of the mass distribution of the object for binary images); for example, moments of order zero and one together provide elementary object descriptors such as the total intensity and the intensity centroid of the object (total mass and center of mass for binary images).

Geometric moments have many desirable characteristics for use as features in object recognition. Central moments that are calculated by shifting the origin of the reference system to the intensity centroid are invariant to translation. Furthermore, geometric moments can be combined to obtain moment features that are invariant to other transformations such as uniform scale variation, aspect-ratio variation and rotation, called geometric moment invariants.

In typical moment-based methods of object recognition, an object is represented by a set of features derived from global moments of the object of various orders. Increasing the order of the moments used provides a larger set of features to represent the object, but also results in a greater sensitivity to noise.

An alternative feature set that does not require the use of higher order moments uses local moments of the object, as opposed to global moments. In a method known as "Zoning" applied to binary images, an n×m (uniform rectangular) grid is superimposed on the object image, and the masses (zero-order moments) of the object in each of the n×m regions are used as features. However, as the outer boundary of the grid is fixed by the outmost points of the object, the addition or subtraction of a piece, even of negligible mass relative to the object, can significantly alter the grid and therefore the extracted features.

Another method based on local moments is described in "Scene Classification by Fuzzy Local Moments" (H. D. Cheng and R. Desai, International Journal of Pattern Recognition and Artificial Intelligence, Vol. 12, No. 7, 921-938, 1998). The method locates the intensity centroid of the object, on which it centers an n×m radial grid; the outer boundary of the grid, the $n^{th}$ concentric circle, is fixed by the object point at the greatest radial distance from the center of mass. The features are the first-order radial moments calculated in each of the n×m regions. This method suffers from the same disadvantage as zoning, namely that the size and position of the grid is fixed by the outer boundary of the object, which is vulnerable to degradation. Also, using a radial system of axes is not computationally efficient.

There is therefore a need in the industry for an object recognition method that will overcome the above-identified drawbacks.

SUMMARY OF THE INVENTION

Accordingly, it is an object of the invention to provide a method used in object recognition that offers the benefits of local moment-based techniques but with an improved robustness to noise.

According to an embodiment of the invention, there is provided a method for determining a similarity score of a target object with respect to a model object. The target object is in a plane and the model object is represented by a model feature vector. The method comprises generating regions of the plane according to a first mass distribution of the target object and a second mass distribution of a part of the target object. Each of the generated regions has a corresponding mass distribution indicator. The method further comprises calculating a target feature vector for the target object according to at least one of the corresponding mass distribution indicators. Finally, the method computes the similarity score using the target feature vector and the model feature vector.

BRIEF DESCRIPTION OF THE DRAWINGS

The detailed description of the invention will refer to the appended drawings, in which:

FIG. 9a-b is a schematic illustrating the processes of generating regions and extracting a feature vector in accordance with FIGS. 4 and 6 for the object recognition phase.

DETAILED DESCRIPTION OF THE INVENTION

Figure 1:
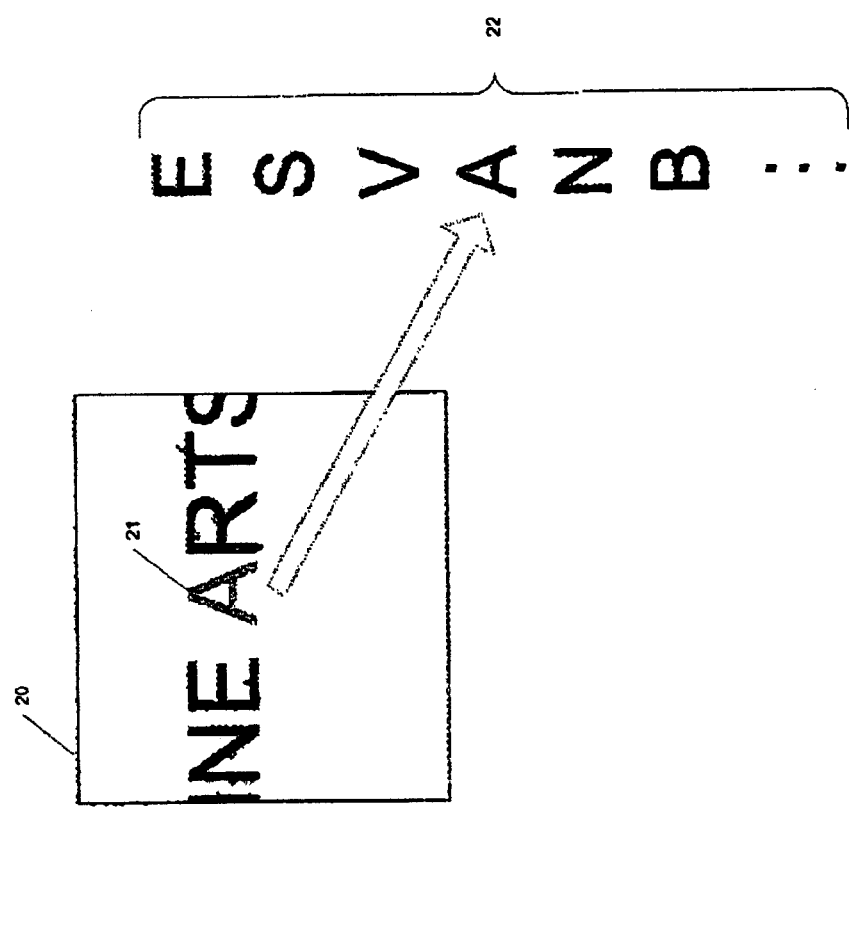
FIG. 1 is a schematic illustrating an exemplary application of the present invention, namely object identification.

FIG. 1 schematically illustrates an exemplary application of the present invention, namely object identification. Object identification is used for Optical Character Recognition or for the recognition of mechanical parts and tools in automated manufacturing, for example. Referring to FIG. 1, object identification consists of identifying an isolated object 21, the target object, in an image 20 as one in a bank of predefined model objects 22. In this application, a similarity score is computed for each of the target-model object pairs. These scores can then be used to select, among the model objects 22, one or more candidates for the target object 21.

The method of the present invention comprises two main phases, namely model definition and object recognition. The model definition phase involves representing the model object by a feature vector, according to a chosen feature extraction scheme. The object recognition phase involves extracting from a target object contained in an image a feature vector according to the chosen feature extraction scheme, and computing a similarity score between this feature vector and the feature vector of the model object.

Model Definition

In the present invention, the model definition phase (FIG. 2) comprises two successive steps: generation of regions of a plane containing a model object (at 200) and extraction of features from these regions (at 202).

The model object can be a suitable image of the object (i.e. an image in which the physical object is neither degraded nor occluded by other objects and taken under suitable conditions of lighting, contrast, noise level, etc.) acquired by an image acquisition device (e.g. gray scale digital camera, electromagnetic or ultra-sonic imaging system, etc.). The acquired image is often converted to another representation, such as a binary representation, or an edge, skeleton or crest representation. Alternatively, the model object can take the form of a so-called "synthetic" description of the object, such as a drawing produced using a software program or a set of mathematical equations describing the mass distribution (or intensity distribution) of the object. In any case, the model object is defined as a set of weighted points in a plane with an associated plane coordinate system. FIG. 5a shows an exemplary model object 23, which for the purpose of the example, is a set of points of equal weight. The model object is in a plane 24 with an associated plane coordinate system 25.

Figure 2:
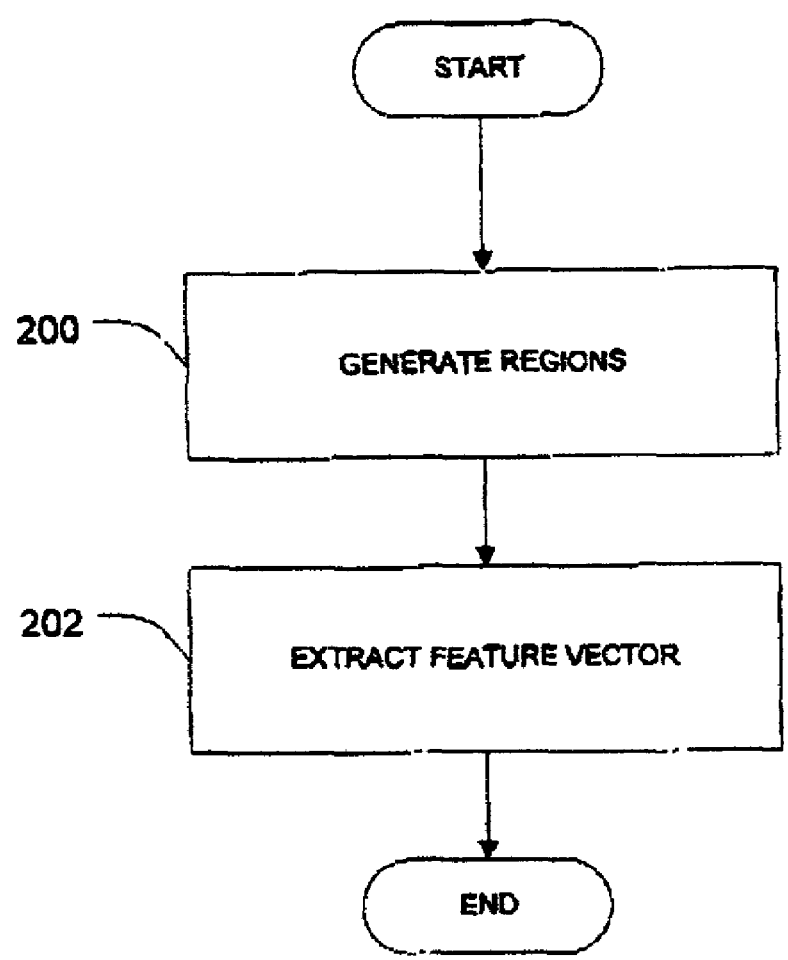
FIG. 2 is a flow chart illustrating principal steps of the model definition phase in accordance with the present invention.
Figure 3:
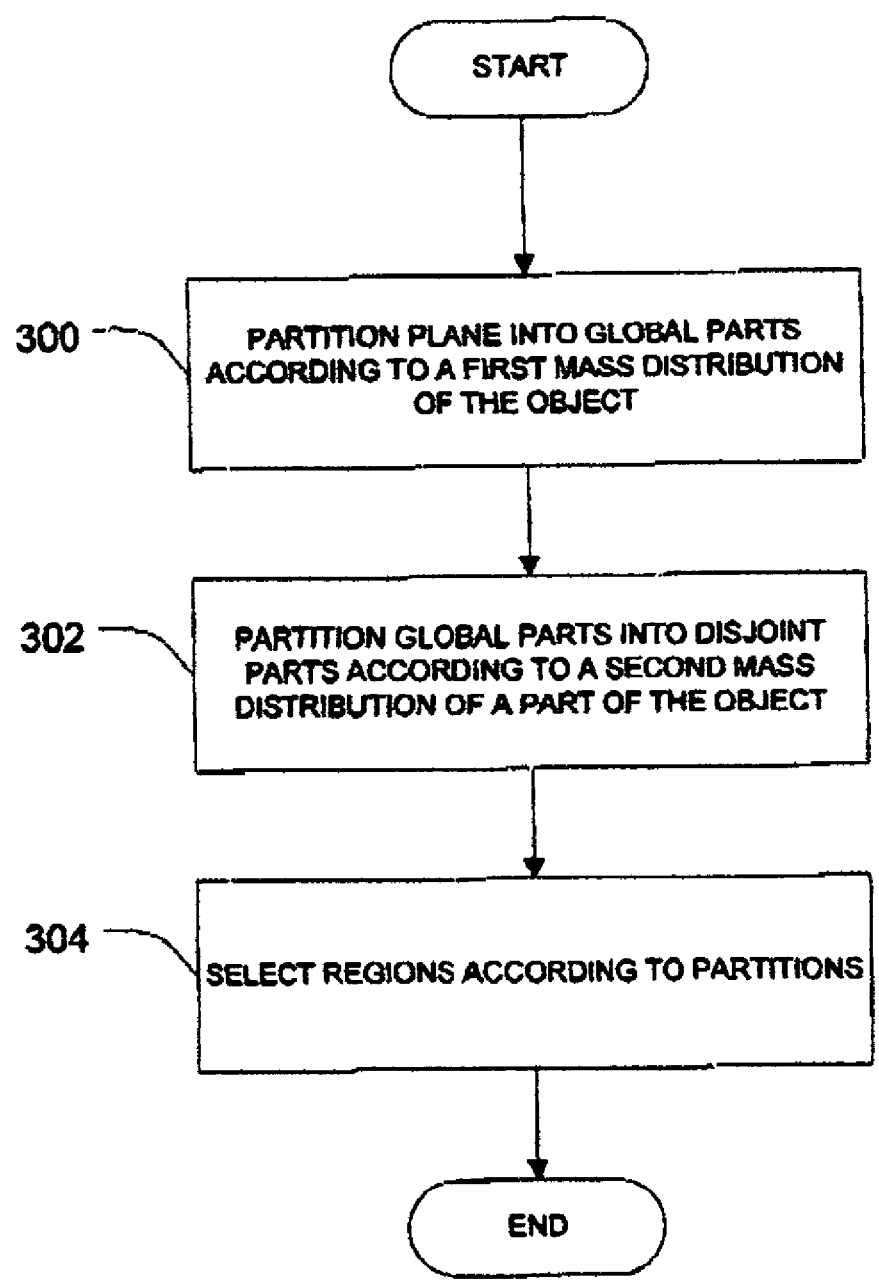
FIG. 3 is a flow chart illustrating principal steps of the process of generating regions, whether during the model definition or the object recognition phase, in accordance with an embodiment of the present invention.

Referring to FIG. 2, the model definition phase begins with generating regions of the plane containing the model object (at 200). As shown in FIG. 3, regions are generated by first partitioning the plane (using two successive partitions at 300 and 302) and then selecting regions based on this partition (at 304). The first partition (at 300) partitions the plane according to a first mass distribution of the object thereby producing global parts. The second partition (at 302) partitions these global parts according to a second mass distribution of a part of the object thereby producing disjoint parts. A region generated from the total partition is defined as any set of one or more of these disjoint parts, and the process of selecting regions based on the partition (at 304) consists of selecting any set of such regions.

Figure 4:
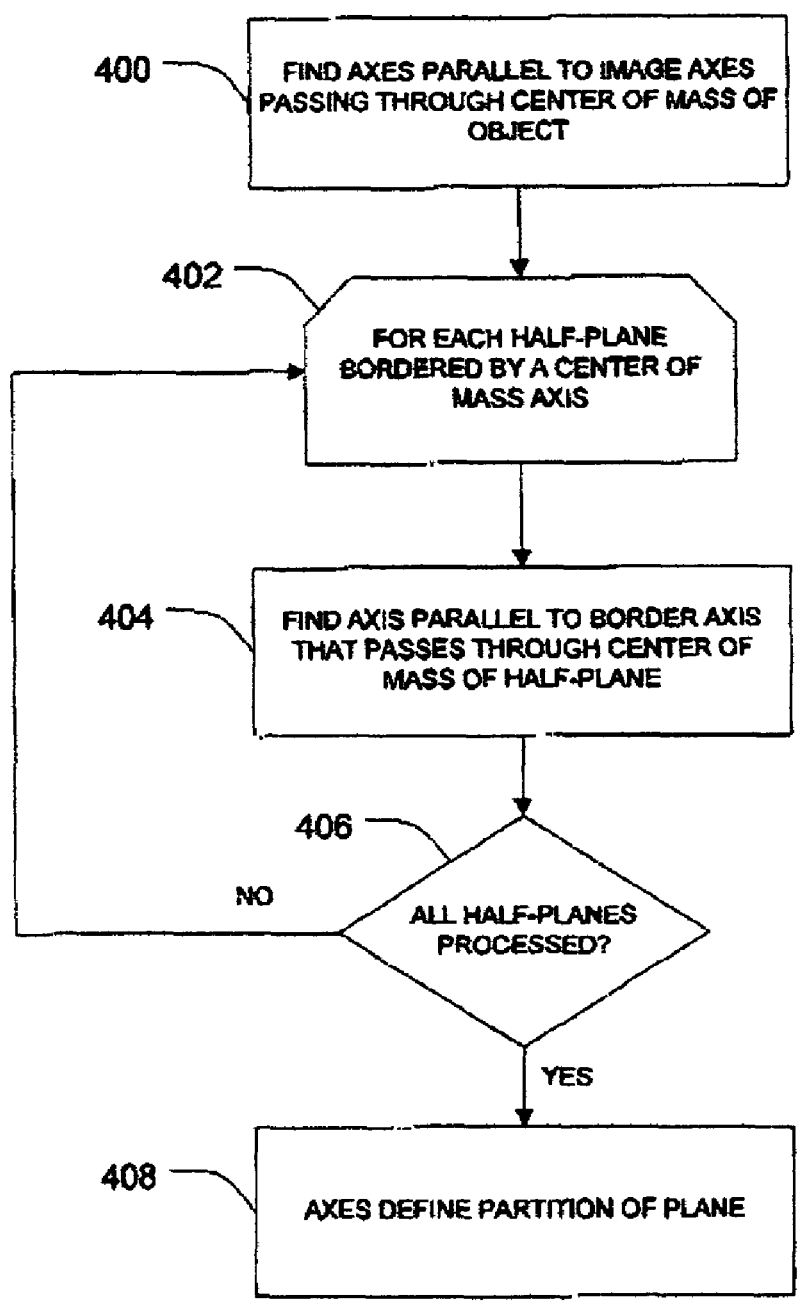
FIG. 4 is a flow chart illustrating principal steps of the process of partitioning the plane containing the object, whether during the model definition or the object recognition phase, in accordance with an embodiment of the present invention.
Figure 5:
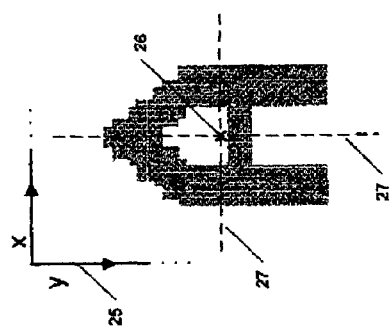
FIG. 5a-d is a schematic sequentially illustrating successive steps in the process of generating regions in accordance with FIG. 4 for the model definition phase.
Figure 5:
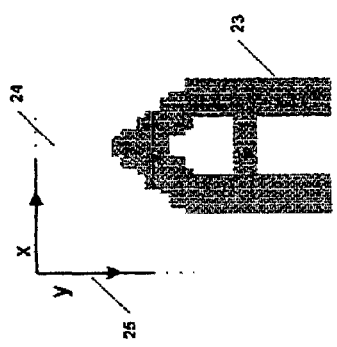
Figure 5:
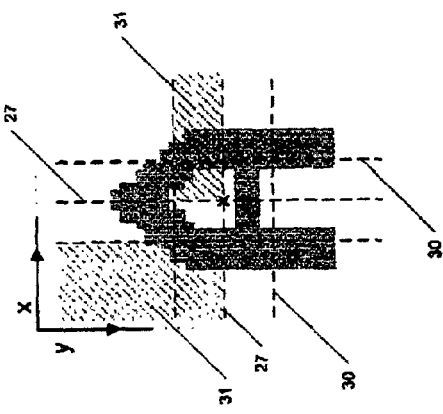
Figure 5:
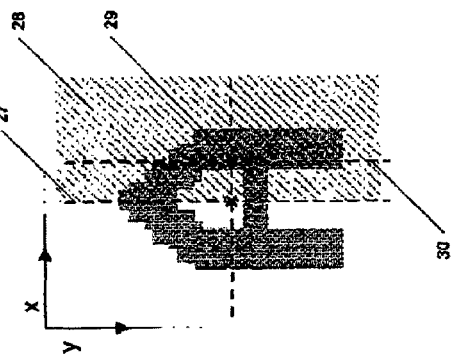

The partitioning of the plane for the preferred embodiment is described with reference to FIGS. 3, 4 and 5. Referring to FIG. 5b, for the first partition (at 300), the method locates the axes 27 parallel to the axes of the plane coordinate system 25 passing through the center of mass 26 of the object 23 (at 400). Referring to FIG. 5c, for the second partition (at 302), the method selects each of the four half-planes bordered by a center of mass axis 27 (at 402). An exemplary half-plane 28 is illustrated in FIG. 5c. For each half-plane, as illustrated for the half-plane 28, the method locates the axis 30 parallel to the bordering center of mass axis 27 passing through the center of mass 29 of the half-plane (at 404); this local center of mass axis is used to partition the quadrants that form the half-plane. As shown in FIG. 5d, the set of global center of mass axes 27 and local center of mass axes 30 define a total partition of the plane into disjoint parts (at 408), and the set of regions selected consists of all the regions 31 obtained by combining two adjacent disjoint parts.

In another preferred embodiment of the invention, the second partition (at 302) is performed by selecting each of the quadrants bordered by the center of mass axes, and for each of these quadrants, locating the axes parallel to the center of mass axes passing through the center of mass of the quadrant. Again, the global and local center of mass axes define a partition of the plane into disjoint parts. In this embodiment, the set of regions selected consists of all the disjoint parts resulting from the partition.

Other indicators of the distribution of mass of the object may be used to partition the object, such as other indicators derived from geometric moments, or alternatively the median.

Referring to FIG. 2, the second step of the model definition phase consists of creating a feature vector for the model object (at 202), by extracting features from the generated regions. An extracted feature can be any indicator of the distribution of mass of the object in the corresponding region, such as an indicator derived from geometric moments of various orders, or alternatively from the median.

Figure 6:
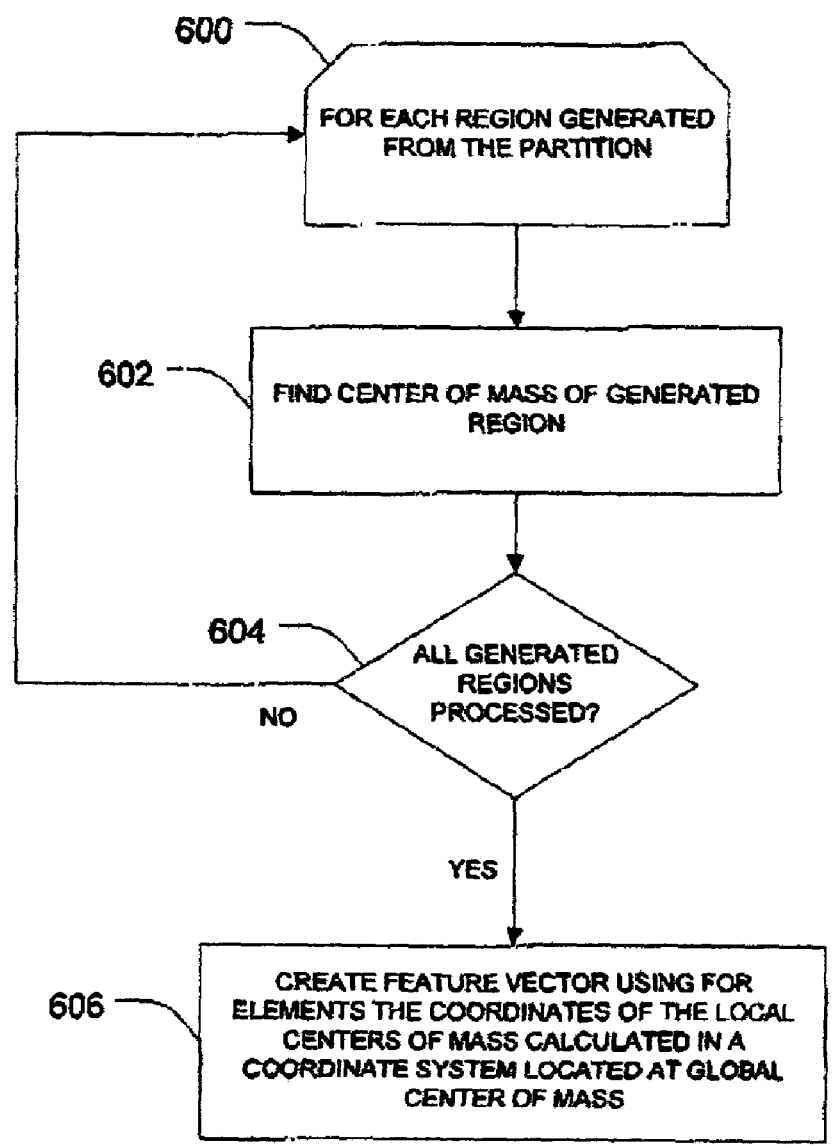
FIG. 6 is a flow chart illustrating principal steps in the process of extracting a feature vector, whether during the model definition or the object recognition phase, in accordance with an embodiment of the present invention.
Figure 7:
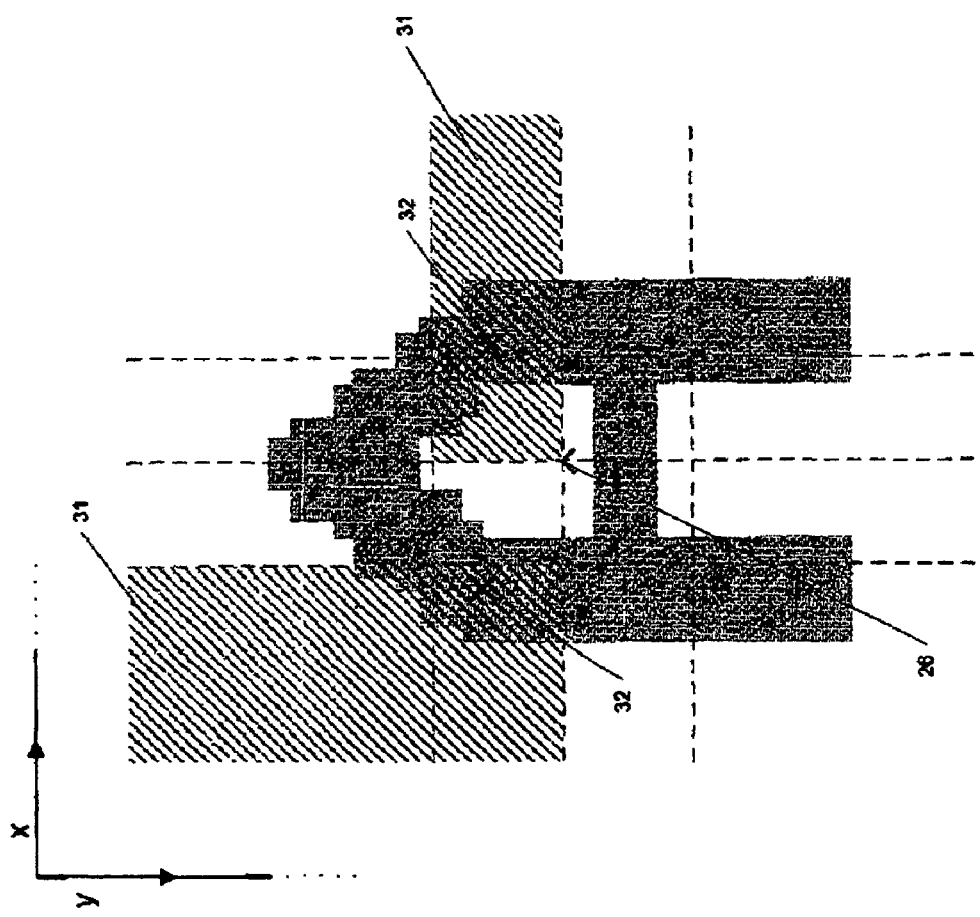
FIG. 7 is a schematic illustrating the process of FIG. 6 for the model definition phase.

In a preferred embodiment, each feature extracted from a region is a coordinate (x or y) of the center of mass of the object in this region. Extraction of the feature vector for the preferred embodiment is described with reference to FIGS. 6 and 7. Referring to FIG. 7, for each of the n generated regions 31, the center of mass 32 $\overline{M}(\overline{x}_i^M, \overline{y}_i^M)$ of the model object in this region is calculated (at 602). The feature vector $V^M$ is then created using, for feature vector elements, the coordinates of the local centers of mass 32 of the object in the n generated regions represented in a coordinate system located at the global center of mass 26 (at 606).

$$V^M = (\overline{x}_1^M, \overline{y}_1^M, \overline{x}_2^M, \overline{y}_2^M, \ldots \overline{x}_n^M, \overline{y}_n^M)$$

Object Recognition

During the object recognition phase, a feature vector is extracted from a target object contained in an image according to the same feature extraction scheme as used during the model definition phase, and a similarity score is then computed between this feature vector and the feature vector of the model object.

Preliminary steps of the object recognition phase include acquiring and pre-processing an image to obtain the target object. First, an image of a scene including a target object for comparison with a model object is acquired using an image acquisition device, such as any of those listed above for obtaining the model object. The model object as it occurs in the target image may have undergone certain affine transformations (e.g. translation, rotation, scale variation, aspect-ratio variation) and degradation of various types (e.g. erosion and dilatation, addition or subtraction of pieces, etc.). Second, the image is pre-processed. Objects in the image are isolated using any method known in the art (e.g. blob analysis, etc.). One or more standardization steps may be applied to the image for the method to support some of the expected transformations; for example, the image may be scaled or rotated for the image objects to appear in a standard size and orientation. Also, the image may be converted to another representation, such as a binary representation, or an edge, skeleton or crest representation. In any case, each isolated object is defined, like the model object, as a set of weighted points; these isolated objects appear in a plane with an associated coordinate system. In a final pre-processing step, a target object is selected among the isolated objects.

FIG. 9a illustrates an exemplary target object 33 and another isolated object 36 in a plane 34 with an associated coordinate system 35. For the purpose of this example, the isolated objects consist of sets of points of equal weight. The target object 33 is an occurrence of the model object 23 that has undergone translation, a variation in scale, and degradation, in particular the addition of a long piece 37.

Figure 8:
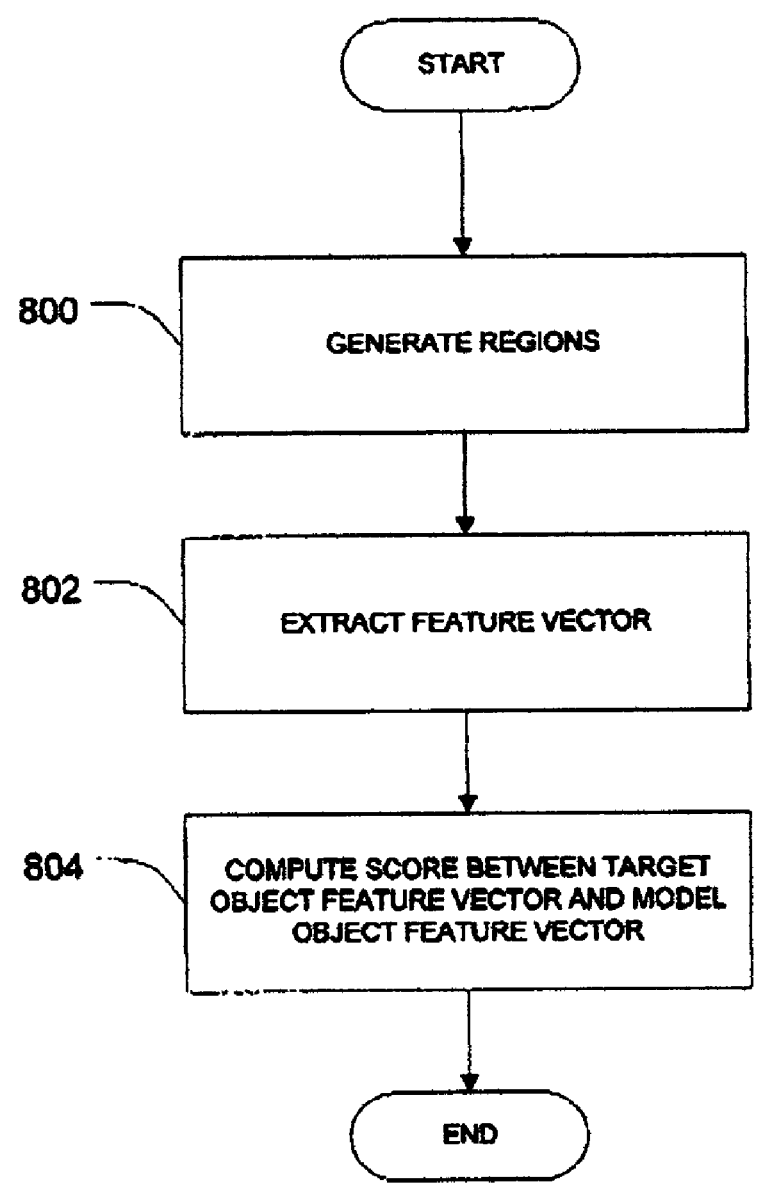
FIG. 8 is a flow chart illustrating principal steps of the object recognition phase in accordance with the present invention.

FIG. 8 is a flow chart illustrating the principal steps of the object recognition phase in accordance with the present invention. The feature vector is extracted from the target object according to the same feature extraction scheme as used for the model definition phase. Thus, referring to FIG. 8, regions of the plane containing the target object are generated (at 800) and then features are extracted from these regions (at 802), following the corresponding steps of the model definition phase (at 200 and 202). The final step consists of computing the similarity score between the target object feature vector and the model object feature vector (at 804).

Regions are generated (at 800) in exactly the same way as during the model definition phase (at 200). Referring to FIG. 3, the plane containing the target object is partitioned (using two successive partitions at 300 and 302), and a set of regions based on this partition is selected (at 304). In a preferred embodiment, regions of the plane are generated as described in FIG. 4. Referring to FIG. 9b, the set of global center of mass axes 39 and local center of mass axes 40 define a partition of the plane 34 containing the target object 33. The set of generated regions consists of all the regions 41 obtained by combining two adjacent disjoint parts of the partition.

The feature vector is extracted from the generated regions (at 802) in precisely the same way as during the model definition phase (at 202). Therefore, in a preferred embodiment, the feature vector is created as described in FIG. 6. Referring to FIG. 9b, for each of the n generated regions 41, the center of mass 42 $\overline{M}(\overline{x}_i^T, \overline{y}_i^T)$ of the target object in this region is calculated (at 602). The feature vector $V^T$ is then created using, for feature vector elements, the coordinates of the local centers of mass of the object in the n generated regions represented in a coordinate system located at the global center of mass 38 (at 606).

$$V^T = (\overline{x}_1^T, \overline{y}_1^T, \overline{x}_2^T, \overline{y}_2^T, \ldots \overline{x}_n^T, \overline{y}_n^T)$$

In the proposed feature extraction scheme, both the method of partitioning and the features themselves present advantages.

First, the method of partitioning a plane containing the object using successive partitions based on local mass distributions of the object is more robust to degradation of the boundary of the object than other methods known in the art. In the present method, a piece added to or subtracted from the object affects the partition proportionally to its mass relative to the object. Thus, a piece of relatively small mass (e.g. 37) will not significantly affect the overall partition or the extracted features as a whole; its effect will be largely restricted to the regions containing the addition or subtraction of mass. Second, the extracted features are derived from first and zero order moments, which are less sensitive to noise than moments of higher order. The local moments are represented in a coordinate system attached to the object and therefore are invariant to translation of the object in the image. Also, using orthogonal coordinate axes parallel to the natural axes of the image is more computationally effective than using a radial system of axes, for example.

The final step of the object recognition phase consists of computing a similarity score between the target and model object feature vectors (at 804). This similarity score is computed using a set of weights assigned to the features. In a preferred embodiment of the invention, all the weights are equal to one, which is equivalent to not using weights.

A commonly used measure of the correspondence between two moment-based feature vectors is Euclidean distance. The Euclidean distance D between the target and model object feature vectors $V^T$ and $V^M$ is given by:

$$D(V^T, V^M) = |V^T - V^M| = \sqrt{\sum_{i=1}^{n}[(\bar{x}_i^T - \bar{x}_i^M)^2 + (\bar{y}_i^T - \bar{y}_i^M)^2]}$$

This measure is simple to compute, but for the method to support a scale difference between the target and model objects, one of the objects or feature vectors must be scaled beforehand.

An alternative measure that is scale invariant is related to the angle $\theta$ between the target and model object feature vectors. The scale invariant similarity score S is given by:

$$S(V^T, V^M) = \cos^2(\theta) = \left(\frac{V^T \cdot V^M}{|V^T||V^M|}\right)^2$$

However, this score does not support independent scale variations in the x and y directions or, equivalently, transformations affecting the aspect ratio of the object.

Figure 10:
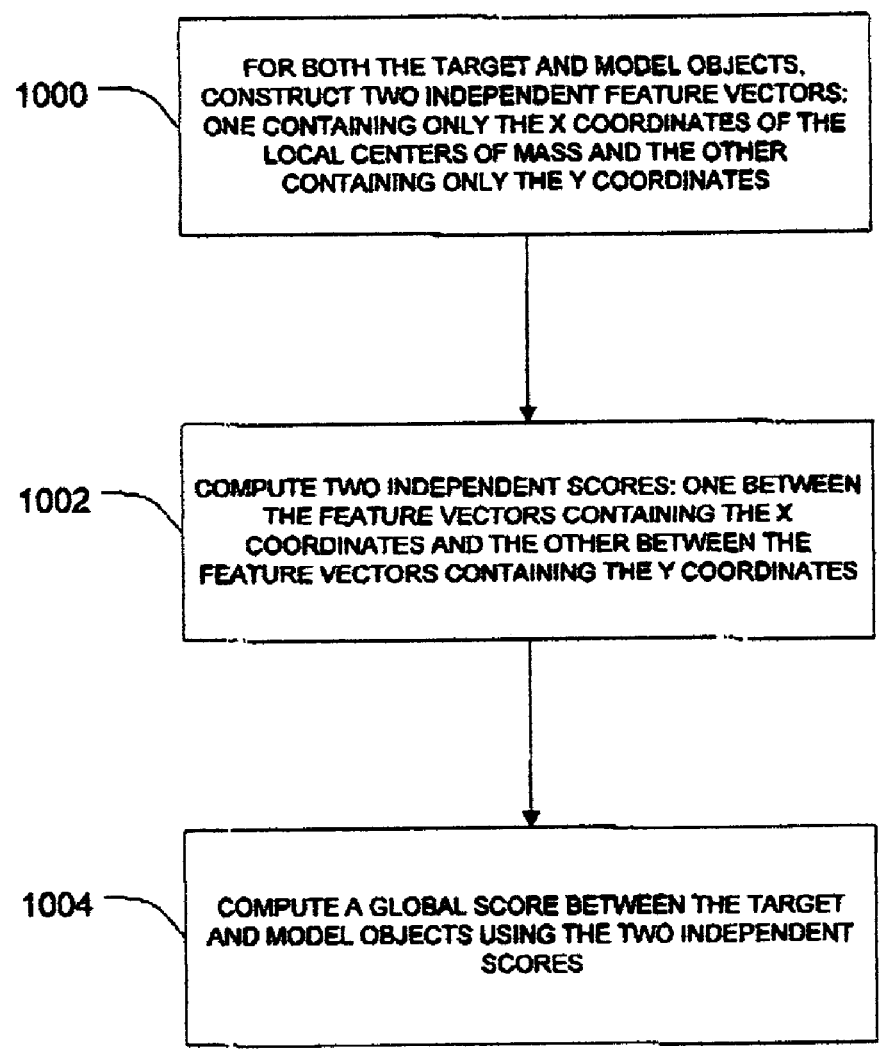
FIG. 10 is a flow chart illustrating principal steps in the process of computing the similarity score in accordance with an embodiment of the present invention.

FIG. 10 illustrates the principal steps of the process of computing an aspect ratio invariant score, in accordance with the preferred embodiment of the invention. First (at 1000), the target and model objects are each represented by two independent feature vectors, the first containing only the x coordinates of the local centers of mass and the other containing only the y coordinates:

$$V_x^T = (\bar{x}_1^T, \bar{x}_2^T, \ldots, \bar{x}_n^T) \quad V_y^T = (\bar{y}_1^T, \bar{y}_2^T, \ldots, \bar{y}_n^T)$$

$$V_x^M = (\bar{x}_1^M, \bar{x}_2^M, \ldots, \bar{x}_n^M) \quad V_y^M = (\bar{y}_1^M, \bar{y}_2^M, \ldots, \bar{y}_n^M)$$

Second (at 1002), two independent similarity scores $S_x$ and $S_y$ are computed for the x and y feature vectors respectively:

$$S_x = S(V_x^T, V_x^M) = \cos^2(\theta_x) = \left(\frac{V_x^T \cdot V_x^M}{|V_x^T||V_x^M|}\right)^2$$

$$S_y = S(V_y^T, V_y^M) = \cos^2(\theta_y) = \left(\frac{V_y^T \cdot V_y^M}{|V_y^T||V_y^M|}\right)^2$$

Finally (at 1004), the global similarity score between the target and model objects is computed as the average of the two independent similarity scores:

$$S(V^T, V^M) = \frac{S_x + S_y}{2}$$

In another embodiment of the invention, non-trivial weights may be used. During a preliminary stage, each pair of corresponding features $\bar{x}_i^T$ and $\bar{x}_i^M$ ($\bar{y}_i^T$ and $\bar{y}_i^M$) of the target and model objects is assigned a weight $w_{i_x}$ ($w_{i_y}$).

$$W = \begin{bmatrix} w_{1x} & 0 & 0 & 0 & & 0 \\ 0 & w_{1y} & 0 & 0 & & 0 \\ 0 & 0 & w_{2x} & 0 & & 0 \\ 0 & 0 & 0 & w_{2y} & & 0 \\ & & & & \ddots & 0 \\ 0 & 0 & 0 & 0 & 0 & w_{ny} \end{bmatrix}$$

The weight matrix can be used with any of the similarity scores described previously. The weighted Euclidean distance $D_W$ and the weighted scale invariant score $S_W$ are given by:

$$D_W(V^T, V^M) = |V^T - V^M|_W = \sqrt{\sum_{i=1}^{n} w_i[(\bar{x}_i^T - \bar{x}_i^M)^2 + (\bar{y}_i^T - \bar{y}_i^M)^2]}$$

$$S_W(V^T, V^M) = \left(\frac{(V^T \cdot V^M)_W}{|V^T|_W |V^M|_W}\right)^2$$

where $$|A|_W = \sqrt{A'WA}$$

$$(A \cdot B)_W = A'WB$$

where A' denotes the transpose of A.

Similarly, a weighted aspect ration invariant score can be obtained by averaging the weighted similarity scores $S_{x_{W_x}}$ and $S_{y_{W_y}}$ for x and y feature vectors given by:

$$S_{x_{W_x}}(V^T, V^M) = \left(\frac{(V_x^T \cdot V_x^M)_{W_x}}{|V_x^T|_{W_x}|V_x^M|_{W_x}}\right)^2 \quad \text{where}$$

$$W_x = \begin{bmatrix} w_{1x} & 0 & 0 & 0 \\ 0 & w_{2x} & 0 & 0 \\ 0 & 0 & \ddots & 0 \\ 0 & 0 & 0 & w_{nx} \end{bmatrix}$$

$$S_{y_{W_y}}(V^T, V^M) = \left(\frac{(V_y^T \cdot V_y^M)_{W_y}}{|V_y^T|_{W_y}|V_y^M|_{W_y}}\right)^2 \quad \text{where}$$

$$W_y = \begin{bmatrix} w_{1y} & 0 & 0 & 0 \\ 0 & w_{2y} & 0 & 0 \\ 0 & 0 & \ddots & 0 \\ 0 & 0 & 0 & w_{ny} \end{bmatrix}$$

An application of the present invention is object identification, which consists of matching a target object contained in an image to one or more model objects contained in a bank of model objects. In this case, similarity scores are computed between the target object and each of the model objects, and these scores are then used to select one or more model objects based on certain criteria.

Given a specific bank of model objects, some of the extracted features vary more over the set of model objects than others and therefore contribute more to differentiating the similarity scores computed between a target object and each of the model objects. In order to accentuate the differences between the similarity scores, larger weights can be assigned to features associated with greater model object variability. In a preferred embodiment, a common weight matrix is assigned to the bank of model objects during a training stage.

The embodiments of the invention described above are intended to be exemplary only. The scope of the invention is therefore intended to be limited solely by the scope of the appended claims.

The invention claimed is:

1. A method for determining a similarity score of a target object with respect to a model object, said target object being in a plane and said model object represented by a model feature vector, the method comprising:
    generating regions of the plane according to a first mass distribution of the target object and a second mass distribution of a part of said target object, each of said regions having a corresponding mass distribution indicator;
    calculating a target feature vector for said target object according to at least one of said corresponding mass distribution indicators; and
    computing said similarity score using said target feature vector and said model feature vector.

2. The method as in claim 1 wherein said generating comprises partitioning said plane to generate said regions according to said first mass distribution and said second mass distribution of a part of said target object.

3. The method as in claim 2 wherein said partitioning said plane comprises:
    partitioning said plane into global parts according to said first mass distribution; and
    partitioning said global parts into disjoint parts according to said second mass distribution.

4. The method as in claim 3 wherein said generating further comprises combining said disjoint parts to obtain a set of regions.

5. The method as in claim 3 wherein said partitioning said plane according to said first mass distribution comprises calculating a global center of mass of said target object and using axes passing through said global center of mass for partitioning said plane.

6. The method as in claim 5 wherein said partitioning according to said first mass distribution comprises partitioning said plane into quadrants having axes passing through said global center of mass.

7. The method as in claim 6 wherein said partitioning according to said second mass distribution comprises calculating a center of mass of each of said quadrants and using axes passing through each center of mass of said quadrants for partitioning corresponding quadrants.

8. The method as claimed in claim 5 wherein said partitioning according to said second mass distribution comprises, for each half-plane bordered by one of said axes passing through said global center of mass, locating an axis parallel to the axis bordering the half-plane and passing through the center of mass of the half-plane and using the determined axis to partition the half-plane.

9. A method as in claim 3 wherein said generating further comprises selecting said disjoint parts to obtain a set of regions.

10. The method as in claim 1 wherein said computing said similarity score comprises calculating a Euclidean distance between said target feature vector and said model feature vector.

11. The method as in claim 1 wherein said computing said similarity score comprises computing a similarity score that is independent of variations in scale of at least one of said model object and said target object.

12. The method of claim 1 wherein said model object is in said plane, the method further comprising:
    generating regions of the plane according to a first mass distribution of the model object and a second mass distribution of a part of said model object, each of said regions generated for said model object having a corresponding model mass distribution indicator; and
    calculating a model feature vector for said model object according to at least one of said corresponding model mass distribution indicators.

13. The method as in claim 1 wherein said model object is taken from a bank of model objects, each of said model objects is represented by a model feature vector, and wherein said computing said similarity score comprises computing a similarity score for each couple comprising said target feature vector and one of said model feature vectors.

14. The method as in claim 13 further comprising, for each said couple comprising said target feature vector and one of said model feature vectors, associating a given weight vector.

15. The method as in claim 1 further comprising associating a given weight vector to the couple comprising said model feature vector and said target feature vector.

16. The method as in claim 15 wherein said computing said similarity score comprises further using said given weight vector.

17. A method as in claim 1 wherein said corresponding mass distribution indicator comprises a first order geometric moment of said generated region.

18. A method for comparing a target object in a plane and a model object represented by a model feature vector, the method comprising:
    generating first parts of said plane according to a first mass distribution indicator of the target object;
    partitioning said first parts into disjoint parts according to a second mass distribution indicator of a part of said target object;
    combining said disjoint parts to obtain a set of regions;
    calculating a target feature vector for said target object according to a third mass distribution indicator; and
    performing a comparison between said target feature vector and said model feature vector.

19. The method as in claim 18 further comprising using said comparison to determine a match between said target object and said model object.

20. The method as in claim 18, wherein the first parts are half planes bordered on one side by a first axis that passes through an origin defined by the first mass distribution indicator.

21. The method as in claim 20, wherein the disjoint parts are defined by constructing, for each half plane, a second axis that is parallel to the first axis and that passes through an origin in the half plane defined by the second mass distribution indicator.

22. The method as in claim 21, wherein the first mass distribution indicator is the center of mass of the target object, the second mass distribution indicator is the center of mass of the half planes, and the third mass distribution indicator is a first order moment of the regions.

23. The method as in claim 20, wherein the first mass distribution indicator is the center of mass of the target object, the second mass distribution indicator is the center of mass of the half planes, and the third mass distribution indicator is a first order moment of the regions.

24. The method as in claim 20, wherein the first mass distribution indicator is the center of mass of the target object, the second mass distribution indicator is the center of mass of the half planes, and the third mass distribution indicator is a coordinate of the center of mass of the regions.

25. A method for comparing a target object and a model object, said target object being in a plane and said model object represented by a first model feature vector and a second model feature vector, the method comprising:
generating regions of the plane;
determining a first target feature vector associated with a first direction of said plane by determining a first target feature associated with said first direction in one or more of said regions;
determining a second target feature vector associated with a second direction of said plane by determining a second target feature associated with said second direction in one or more of said regions;
computing a first similarity score using said first target feature vector and said first model feature vector; and
computing a second similarity score using said second target feature vector and said second model feature vector.

26. A method as claimed in claim 25, wherein said target object and said model object have different scale ratios in said first and second directions.

27. A method as claimed in claim 25, further comprising determining a third similarity score by combining said first and said second similarity scores.

28. A method as claimed in claim 27, wherein said third similarity score is invariant to independent scale variations in said first and second directions.

29. A method as claimed in claim 25, wherein said model object is in a model plane, the method further comprising:
generating regions of said model plane;
determining a first model feature vector associated with a first direction of said model plane by determining a first model feature associated with said first direction of the model plane in one or more of said regions of the model plane; and
determining a second model feature vector associated with a second direction of said model plane by determining a second model feature associated with said second direction of the model plane in one or more of said regions of the model plane.

30. A method as claimed in claim 25, wherein at least one of said first target feature and said second target feature is a mass distribution indicator.

31. A method as claimed in claim 30, wherein said mass distribution indicator is a first order geometric moment.

32. A method as claimed in claim 25, wherein said first similarity score is independent of a difference in scale in said first direction between said target object and said model object, and wherein said second similarity score is independent of a difference in scale in said second direction between said target object and said model object.

33. A method as claimed in claim 25, wherein said first similarity score is independent of a scaling factor between said first target feature vector and said first model feature vector, and wherein said second similarity score is independent of a scaling factor between said second target feature vector and said second model feature vector.

34. A method as claimed in claim 33, wherein said computing a first similarity score comprises determining a scalar product between said first target feature vector and said first model feature vector, dividing said scalar product by the product of the magnitudes of said first target feature vector and said first model feature vector, and performing the square of the result, and wherein
said computing a second similarity score comprises determining a second scalar product between said second target feature vector and said second model feature vector, dividing said second scalar product by the product of the magnitudes of said second target feature vector and said second model feature vector to obtain a second result, and performing the square of said second result.

35. A method as claimed in claim 25, wherein said generating regions of the plane comprises partitioning said plane.

36. A method as claimed in claim 35, wherein said partitioning comprises partitioning said plane according to a mass distribution of the target object.

37. A method as claimed in claim 36, wherein said partitioning further comprises partitioning said plane according to a first mass distribution of the target object and a second mass distribution of a part of said target object.

* * * * *